US005870192A

United States Patent [19]
Barker

[11] Patent Number: 5,870,192
[45] Date of Patent: Feb. 9, 1999

[54] MULTIBEAM VISAR USING IMAGE COUPLING FROM ONE OPTICAL FIBER BUNDLE TO ANOTHER THROUGH THE VISAR INTERFEROMETER

[76] Inventor: Lynn M. Barker, 13229 Circulo Largo NE., Albuquerque, N. Mex. 87112

[21] Appl. No.: 75,389

[22] Filed: May 8, 1998

[51] Int. Cl.$^6$ .................................................. G01B 09/02
[52] U.S. Cl. .......................................... 356/345; 356/352
[58] Field of Search ..................................... 356/345, 352

[56] References Cited

U.S. PATENT DOCUMENTS

| | | | |
|---|---|---|---|
| 5,202,558 | 4/1993 | Barker | 250/227.21 |
| 5,481,359 | 1/1996 | Barker | 356/352 |

OTHER PUBLICATIONS

L. M. Barker, "Velocity Interferometry for Time–Resolved High Velocity," in Proc. SPIE 27th Annual International Technical Symposium and Instrument Display, San Diego, CA, Aug. 21–26, 1983.

L. M. Barker and R. E. Hollenback, "Laser Interferometer for Measuring High Velocities of Any Reflecting Surface," Journal of Applied Physics, vol. 43, pp. 4669–4675, Nov. 1972.

B. T. Amery, "Wide Range Velocity Interferometer," in Sixth Symposium on Detonation (Oface of Naval Research, Dept. of the Navy, Arlington, VA, Aug. 24–27, 1976) pp. 673–681.

W. F. Hemsing, "Velocity Sensing Interferometer (VISAR) Modification," Review of Scientific Intstruments, vol. 50, pp. 73–78, 1979.

W. F. Hemsing, et. al., "VISAR: Line–Imaging Interferometer," in Shock Compression of Condensed Matter, pp. 768–770 (1992), copyright Elsevier Science Publishers B. V.

K. Baumung, et. al., "Hydrodynamic Proton Beam–Target Interaction Experiments Using an Improved Line–Imaging Velocimeter," in Shock Compression of Condensed Matter—1995, pp. 1015–1018 (1996), AIP Press, Woodbury, N.Y.

*Primary Examiner*—Robert Kim
*Assistant Examiner*—Andrew H. Lee

[57] ABSTRACT

A multi-beam Velocity Interferometer System for Any Reflector (VISAR) which can measure velocity histories at multiple locations simultaneously. A VISAR's interferometer accepts laser signal light which has been reflected from a specimen surface, and produces light fringes in proportion to the reflecting surface velocity by virtue of the Doppler shift in wavelength. The invention uses a reflected-light fiber optic bundle to supply the signal light for the VISAR. The bundle has multiple optical fibers, each carrying light reflected from a separate measurement location. The light emerging from the reflected-light fiber bundle is transformed into a beam by a collimator. The beam travels through the conventional VISAR interferometer, emerging usually in two or four exit beams. Imaging optics in the exit beams, together with the collimator, create real images of the end of the reflected-light fiber bundle. The light reflected from the different locations of measurement is not segregated while traversing the interferometer. However, in the exit beam images, the light from each individual reflected-light optical fiber is resegregated, and forms the separate images of the ends of the individual fibers. This allows the separated signals from each location of measurement to be recaptured and sent to assigned light detectors for sensing, recording, and later data reduction to velocities vs. time. The multibeam VISAR preserves the high-quality optical fringes, accuracy, and ease-of-use features of many former VISARs, and is capable of economically measuring at least tens of locations simultaneously.

7 Claims, 3 Drawing Sheets

MULTIBEAM VISAR USING IMAGE COUPLING FROM ONE OPTICAL FIBER BUNDLE TO ANOTHER THROUGH THE VISAR INTERFEROMETER

BACKGROUND OF THE INVENTION

1. Field of the Invention

The present invention relates to laser velocity interferometry, specifically to an improved laser velocity interferometer which simultaneously measures large changes in velocity of multiple points on a material surface.

2. Discussion of Prior Art

Shock experiments involving projectile impacts or explosive detonations have been used for several decades to determine material properties under dynamic conditions and at extremely high pressures.

One of the most valuable instrumentation techniques in shock experiments has been laser velocity interferometry, in which laser light is focused at a location of measurement on the specimen's surface. Some of the reflected light is collected, and, as the surface moves during a shock experiment, the Doppler shift of the reflected light is measured in an interferometer. The continuous measurement of the Doppler shift results in a continuous velocity history of the location of measurement on the shocked specimen, from which, together with other information, the specimen material properties are calculated.

A review of the field of laser velocity interferometry can be found in the paper by L. M. Barker, "Velocity Interferometry for Time-Resolved High-Velocity Measurements," which appears in Proceedings of SPIE 27th Annual International Technical Symposium and Instrument Display, San Diego, Calif., Aug. 21–26, 1983.

The most common form of laser velocity interferometer has been the so-called Velocity Interferometer System for Any Reflector (VISAR), which was originally developed at Sandia National Laboratories by L. M. Barker and R. E. Hollenbach in the early 1970s. Our first technical paper on the VISAR was L. M. Barker and R. E. Hollenbach, "Laser Interferometer for Measuring High Velocities of Any Reflecting Surface," Journal of Applied Physics, Vol. 43, No. 11, pp 4669–4675, November, 1972.

The term VISAR generally includes (a) the laser velocity interferometer which produces good fringe contrast even when illuminated by light from a diffusely reflecting surface, (b) any optical elements necessary to make the input signal light into a beam suitable to traverse the optics of the interferometer, (c) any optics both within and outside of the interferometer which are necessary for producing fringes in quadrature, (d) any optics which are involved in producing the required delay time in one of the light paths of the interferometer, (e) any optics to direct the output signal light to light detectors, (f) the light detectors themselves, and (g) any incidental optical elements to direct, shape, filter, or adjust the intensity of the light beams which traverse or interact with the aforementioned components. Any optical mounts, frames, enclosures, adjusting devices, etc., associated with the aforementioned components are also generally considered to be included in the term VISAR. In addition, the optical elements which guide the laser light to the location of measurement on the specimen, and which gather reflected light from the location of measurement and guide it to the VISAR interferometer are often included.

The VISAR works by using a beamsplitter to split the incident light beam, which is composed of light reflected from a location of measurement on a specimen, into the two light paths (legs) of an interferometer. The legs of the interferometer have unequal light travel times before the two split-off light beams are recombined, i.e., one of the light beams is delayed slightly with respect to the other. However, in spite of the delay time they meet the criteria for forming high-contrast fringe patterns, even when the interferometer is illuminated by light from a diffusely reflecting surface.

The delay time in the VISAR interferometer causes it to produce a shift in interference fringes whenever the wavelength of the light beam through the interferometer changes. Thus, if the surface acquires a velocity, the wavelength of the reflected light changes by the Doppler effect, and the VISAR interferometer interference fringe position shifts. The amount of the shift is proportional to the change in the reflecting surface velocity, and also to the delay time in the VISAR interferometer.

The specimen velocity change which causes a fringe shift of one fringe is called the VISAR's Velocity-Per-Fringe (VPF) constant. VISARs are usually made to allow for changing the VPF by adding or subtracting delay etalons in the delay leg of the VISAR. The VPF of such multi-etalon VISARs can be changed to best fit the needs of a particular experiment.

When a VISAR interferometer is properly aligned, the output signal beams normally show only the central "bull's eye" of the interferometer's fringe pattern, where only a small part of a fringe is visible at any one time, and a fringe shift of one fringe appears as one complete cycling of the light intensity.

The light fringes produced by a VISAR in a velocity measurement are normally recorded using light detectors, such as photomultipliers, to change the fringe light intensity variations into voltage variations. Digitizing oscilloscopes may be used to record the voltage variations. The voltage-time data points collected by the oscilloscopes can then be analyzed in a computer program to obtain the velocity vs. time of the measured location during the experiment. Streak cameras have also been used to record the VISAR fringe shifts during an experiment.

VISARs can use polarization coding to obtain sets of fringes approximately 90° out-of-phase with each other. This greatly enhances the accuracy of the data, allowing the fringe count to be determined at any time to about ±2% of one fringe, such that a data record containing four fringes can be expected to be accurate to within ½% of the peak velocity. The polarization coding also allows one to distinguish acceleration from deceleration.

The original VISARs had these attributes:
(1) Variable sensitivity to fit the experiment, by varying the delay time,
(2) The ability to measure any surface, whether specular or diffusely reflecting,
(3) Polarization coding for accuracy and for distinguishing acceleration from deceleration,
(4) Fringes in proportion to velocity, not displacement, greatly decreasing the frequency response required to acquire the data, as well as decreasing the complexity of the data reduction,
(5) Nanosecond time resolution,
(6) Better than 1% accuracy in most experiments, and
(7) Absence of any perturbation (by the instrumentation) of the velocity being measured.

Improvements to the VISAR A 1976 paper by B. T. Amery, "Wide Range Velocity Interferometer," in Sixth Symposium on Detonation (Office of Naval Research, Dept. of the Navy, Arlington Va., Aug. 24–27, 1976), pp. 673–681, pointed out that the delay etalons in a VISAR interferometer can be replaced by two lenses separated by the sum of their focal lengths. A much wider range of delay times is available with the lens-generated delay leg, which allows for accurate measurements of smaller velocities when long delay times are used. The present invention relates not only to multi-etalon VISARs, but to Amery's lens delay leg VISARs as well.

A very significant improvement to the VISAR was made by W. F. Hemsing in 1978, and published in his paper "Velocity sensing Interferometer (VISAR) Modification," Review of Scientific Instruments, Vol. 50, No. 1, pp 73–78, 1979. Hemsing's improvement, called the "push-pull VISAR," cuts the amount of required laser light by at least 50% without any sacrifice in the signal-to-noise ratio of the instrument by making better use of the light emerging from the VISAR interferometer. In addition, stray non-laser light which may find its way into the signal light beam, such as self-light generated by the experiment, is largely self-canceling. Hemsing's push-pull improvement retains all of the above listed attributes.

Another major VISAR advance which retains all of the above attributes, including the Hemsing improvement, is described in U.S. Pat. No. 5,481,359 to Barker (1996). The patent covers design features which make VISARs smaller, portable, stable, and easy-to-use. Over 30 VISARs based on this patent have already been sold and delivered.

Because of the VISAR's impressive list of attributes, it has become widely recognized as the instrumentation technique of choice in certain applications requiring accurate measurement of large velocity changes.

Nevertheless, the usefulness of VISARs has been limited by the fact that they normally measure the velocity of only one location at a time. Attempts to overcome this limitation have involved devoting more than one VISAR at a time to a specimen, or measuring different locations on a specimen in successive identical experiments. Neither of these approaches is very satisfactory because VISARs, and especially the VISAR interferometers with their delay etalons, are quite expensive, costing at least tens of thousands of dollars each. In addition, the experiments can also be very expensive, and achieving sufficiently good experimental repeatability to measure different locations in successive experiments can be difficult or impossible.

In recent years, "Line VISAR" instrumentation has been developed which in principle measures the velocity at all locations along a straight line on the specimen surface. The technique was described by W. F. Hemsing, A. R. Mathews, R. H. Warnes, M. J. George, and G. R. Whittemore, "VISAR: Line-Imaging Interferometer," in Shock Compression of Condensed Matter, pp. 768–770 (1992), © Elsevier Science Publishers B. V. It involved using a laser beam and a cylindrical lens to illuminate a line across a specimen surface. Light reflected from the line was focused through the VISAR interferometer such that real images of the line appeared at the entrance slit of a streak camera, which recorded the fringe shifts along the line image. A similar line imaging VISAR with apparently improved optics was reported by K. Baumung, J. Singer, S. V. Razorenov, and A. V. Utkin, "Hydrodynamic Proton Beam-Target Interaction Experiments Using an Improved Line-Imaging Velocimeter," in *Shock Compression of Condensed Matter—1995*, pp. 1015–1018 (1996), AIP Press, Woodbury, N.Y.

The line-imaging VISARs of both Hemsing, et. al., and Baumung, et. al., rely on streak cameras to record the data, with consequent difficulties such as more crude data reduction techniques and a very small number of data points in time compared to digitizing oscilloscope recordings. Also, data collection is limited to a relatively short straight line on the specimen, whereas data from a larger area, or at least a non-linear one, would often be an advantage.

In the early 1980s, Dr. Datta Dandekar of the U. S Naval Research Laboratories contracted with the University of Arizona Optics Department to implement his ideas for a four-beam VISAR. The design sends four data beams simultaneously through a single VISAR interferometer. The resulting instrument was so difficult to align that it could not be productively used. Finally, its design was extensively modified and converted to optical fiber light transport in 1991–92 by L. M. Barker of Valyn, International. Since then, Dandekar's four-beam VISAR has been a viable velocimeter, capable of measuring the velocities of up to four locations simultaneously, anywhere on a specimen. However, I know of no published documentation of this VISAR.

The main difficulty with the Dandekar four-beam VISAR is its poor fringe quality, caused by its use of a different collimator for each of the light signals reflected from the four locations of measurement on the specimen. Because of the unavoidable physical size of the collimators, the effective size of their combined output beams is quite large, thereby precluding high-quality interferometer fringes without prohibitively large and expensive interferometer optical components.

Other drawbacks have been the difficulty of aligning the instrument's interferometer for optimum fringes, and the complications of changing its sensitivity, or velocity-per-fringe constant. No other laboratory has attempted to duplicate nor improve on the ARL four-beam VISAR design despite its use by Dandekar's group for the past six years. The fact that 50 to 100 new single-beam VISARs have been constructed during this time, four of which were purchased by Dandekar's group, is indicative of the problems of this multi-beam VISAR.

OBJECTS OF THE INVENTION

Accordingly, several objects of the present invention are to provide a VISAR in which:

1. Multiple locations on a specimen can be measured for velocity vs. time simultaneously, using only one VISAR interferometer.
2. The fringe quality produced by the VISAR interferometer is as good for multiple-beam operation as for single-beam operation.
3. The alignment, stability, and ease-of-use features of the VISAR interferometer are at least equal to those of single-beam VISARs.
4. The cost of making multiple VISAR measurements simultaneously is greatly reduced.

SUMMARY OF THE INVENTION

These and other objects and advantages are achieved in my new multi-beam VISAR. The invention consists of a VISAR which makes use of reflected-light optical fibers to collect laser light reflected from multiple locations of measurement. The light from each location may be collected by one or more reflected-light optical fibers. However, it should be segregated, as far as possible, from light from other locations of measurement collected by other reflected-light optical fibers. The light input ends of the reflected-light optical fibers may or may not be in a bundle. Their output ends are preferably gathered together into a reflected-light fiber bundle in the VISAR's collimator. The single VISAR collimator collimates the light emerging from the reflected-light fiber bundle into a beam, and the beam follows the optical paths through the components of the VISAR interferometer. In the process of traversing the interferometer and associated components, the beam is split into two, or usually four exit beams. Optical components are used to create real images of the end of the reflected-light fiber bundle in each of the exit beams. The light reflected from each location of measurement is segregated from the light from the other locations in these real images.

Because of the segregation, the light reflected from each location of measurement can be separately recaptured and guided to assigned light detectors. In practice, this can be done by placing the ends of recaptured-light optical fibers in the images of the reflected-light fiber bundle. The light detector outputs comprise interferometer fringe information which is recorded electronically for later data reduction to velocity vs. time information. The data reduction calculations for any one location of measurement are exactly the same as for a single VISAR velocity measurement.

My multi-beam VISAR uses a single light collimator, preferably with a bundle of reflected-fibers supplying the light to be collimated. This keeps the collimated beam of light VISAR interferometer relatively small. The small beam size allows current VISAR interferometer component sizes, and even current VISARs, to be converted to multi-beam capability. It also results in retaining the excellent fringe quality and contrast which is common in single-beam VISARs.

The features and advantages of my multi-beam VISAR will become more apparent from the following detailed description when read with the accompanying drawings.

DESCRIPTION OF THE DRAWINGS

The accompanying drawings are only for the purpose of illustrating two preferred embodiments of my multi-beam VISAR, and are not to be construed as limiting the invention.

LIST OF REFERENCE NUMERALS

Figure 1:
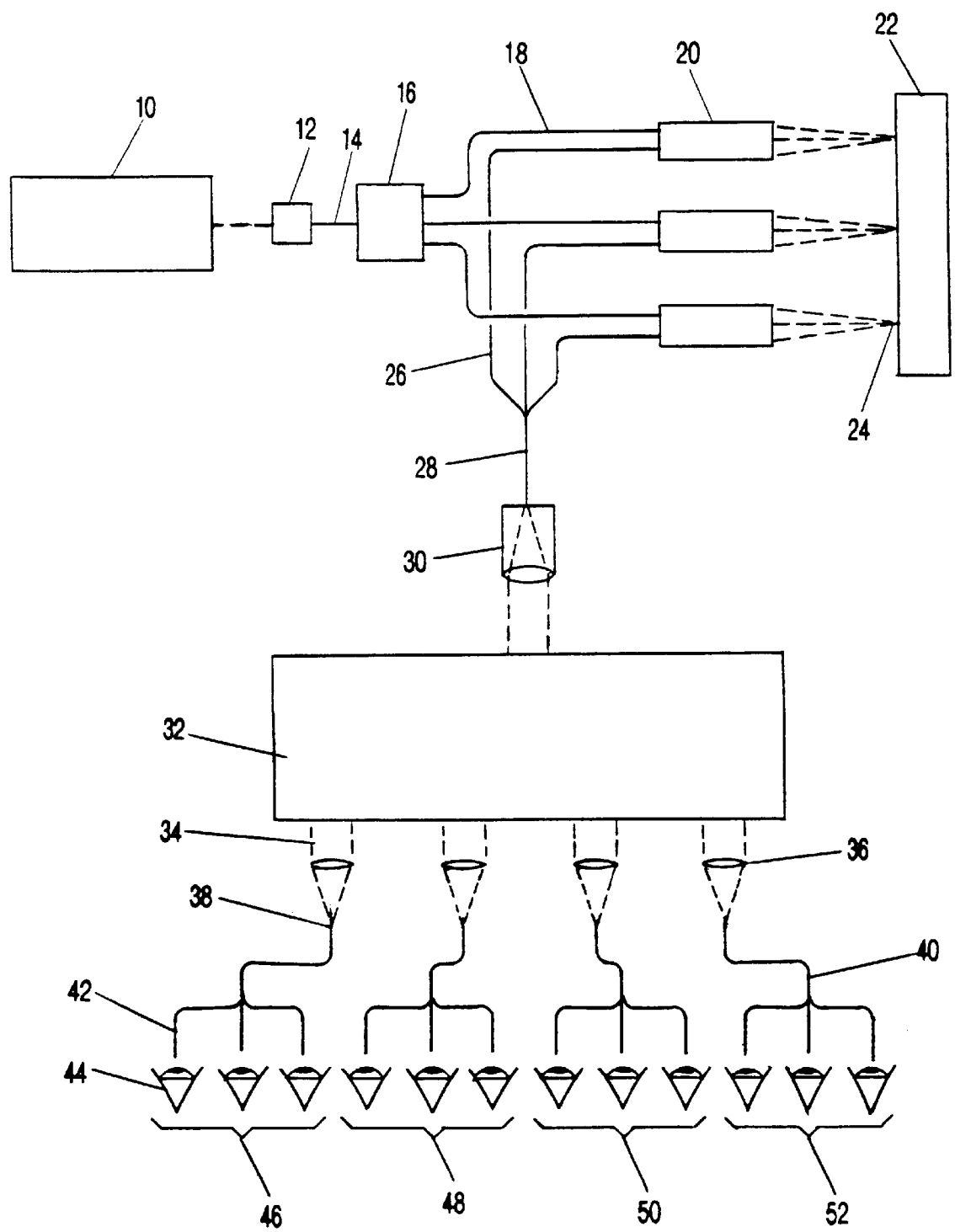
FIG. 1 shows a schematic of some of the components used in a multi-beam VISAR measurement of the velocities of three locations of measurement on a specimen.

| No. | FIG. No. | Description |
| --- | --- | --- |
| 10 | 1,3 | Laser |
| 12 | 1,3 | Fiber optic laser coupler |
| 14 | 1,3 | Laser-light optical fiber |
| 16 | 1 | Three-way optical fiber splitter |
| 18 | 1 | Splitter-to-probe laser-light optical fiber (1 of 3) |
| 20 | 1 | Fiber optic probe (1 of 3) |
| 22 | 1,3 | Specimen |
| 24 | 1 | Location of measurement (1 of 3) |
| 26 | 1 | Reflected-light optical fiber (1 of 3) |
| 28 | 1 | Reflected-light fiber bundle |
| 30 | 1,3 | Adjustable-focus VISAR collimator |
| 32 | 1,3 | VISAR interferometer and polarization-coding optics |
| 34 | 1,3 | Exit beam (1 of 4) |
| 36 | 1,3 | Imaging optic (1 of 4) |
| 38 | 1,3 | Exit beam image; recaptured-light fiber bundle end (1 of 4) |
| 40 | 1,3 | Recaptured-light fiber bundle (1 of 4) |
| 42 | 1,3 | Recaptured-light optical fiber (1 of many) |
| 44 | 1,3 | Light detector (1 of many) |
| 46 | 1,3 | Light detectors sensing 0° fringe signals |
| 48 | 1,3 | Light detectors sensing 90° fringe signals |
| 50 | 1,3 | Light detectors sensing 180° fringe signals |
| 52 | 1,3 | Light detectors sensing 270° fringe signals |
| 54 | 2 | O.D. of recaptured-light optical fiber (1 of 3) |
| 56 | 2 | Core Dia. of recaptured-light optical fiber (1 of 3) |
| 58 | 2 | Jacket of recaptured-light fiber bundle |
| 60 | 2 | Image of a reflected-light optical fiber (1 of 3) |
| 62 | 3 | Special imaging fiber optic probe |
| 64 | 3 | Area of measurement |
| 66 | 3 | Image-preserving optical fiber bundle |

DESCRIPTION OF FIRST EMBODIMENT OF THE INVENTION

FIG. 1 shows a schematic of a first preferred embodiment of my multi-beam VISAR. The open-beam light paths are shown as dashed lines. A laser 10 is located in front of a fiber optic laser coupler 12, which holds one end of a 50/125 µm laser-light optical fiber 14. The other end terminates in an optical fiber splitter 16, having three output 50/125 µm laser light fibers 18 leading to three fiber optic probes 20. A specimen 22 is positioned so that three locations of measurement 24 are located at the focal distances from the fiber optic probes 20. The fiber optic probes 20 also contain the ends of 300 µm reflected-light optical fibers 26, which are later gathered together into a single reflected-light fiber bundle 28. The reflected-light fiber bundle 28 terminates in the adjustable-focus VISAR collimator 30 located at the entrance to the VISAR interferometer and polarization-coding optics 32. The VISAR interferometer and polarization-coding optics 32 have four exit beams 34 which pass through imaging optics 36. The ends of four recaptured-light fiber bundles 38 are located at the imaging planes of the imaging optics 36. The three 500 µm recaptured-light optical fibers 42 of each of the four recaptured-light fiber bundles 40 are split apart and terminate in light detectors 44, which sense the 0° fringe signals 46, the 90° fringe signals 48, the 180° fringe signals 50, and the 270° fringe signals 52.

Figure 2:
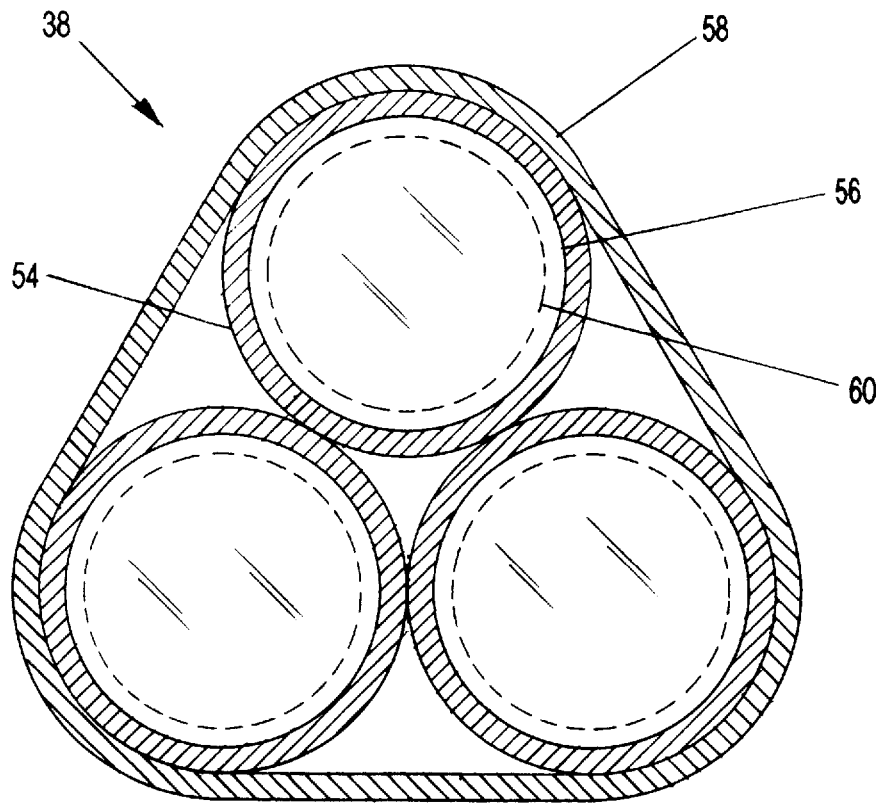
FIG. 2 shows a schematic of the end of the recaptured-light fiber bundle, with an image of the end of the reflected-light fiber bundle superimposed.

FIG. 2, also referring to the first embodiment of my multi-beam VISAR, shows a greatly magnified view of the ends of the three recaptured-light optical fibers having outside diameters 54 and 500 µm core diameters 56. A jacket 58 holds the three recaptured-light fibers in a bundle 40. The dashed lines represent the real images 60 of the ends of the 300 µm reflected-light optical fibers 26 which comprise the reflected-light fiber bundle 28.

OPERATION OF FIRST EMBODIMENT OF THE INVENTION

The laser 10 supplies the necessary single-frequency light for proper functioning of the VISAR interferometer and polarization-coding optics 32 (See U.S. Pat. No. 5,481,359 to Barker, 1996). The fiber optic laser coupler 12 gathers the laser light into the 50/125 µm laser-light optical fiber 14, which conducts it to the three-way optical fiber splitter 16. The three 50/125 µm fibers 18 emerging from the splitter conduct their light to the three fiber optic probes 20 (U.S. Pat. No. 5,202,558 to Barker, 1993). The probes focus the light from the fibers onto three locations of measurement 24 on the specimen 22. Some of the reflected light from each location of measurement is collected into 300 μm reflected-light optical fibers 26 by the fiber optic probes 20, each probe collecting only light reflected from one location of measurement. The reflected-light optical fibers are later joined together into the reflected-light fiber bundle 28. The light emerging from the end of the reflected-light fiber bundle is collimated into a beam by the adjustable-focus collimator 30 for transit through the VISAR interferometer and polarization coding optics 32. The four exit beams 34 from the interferometer pass through imaging optics 36, which, together with the adjustable-focus collimator 30, cause images of the end of the reflected-light fiber bundle 28 to be formed on the ends of the four recaptured-light fiber bundles 38. Each recaptured-light fiber bundle comprises three recaptured-light optical fibers 42.

The recaptured-light fiber bundles must be properly oriented in the images of the end of the reflected-light fiber bundle so that the image of only one reflected-light fiber falls on the end of any one recaptured-light optical fiber. This assures segregation of the light from the three locations of measurement in the recaptured-light optical fibers.

As the specimen surface begins to move during the event of interest, Doppler shifts in the frequency of the reflected laser light are produced according to the velocities of each of the locations of measurement. The VISAR interferometer and polarization optics 32 produce interference fringes in the exit beams 34. The fringes shift according to the amount of the Doppler shift in frequency, i.e., according to the individual velocities of the locations of measurement. In the exit beams 34, the fringes with different fringe shifts are initially superimposed. However, in the images created by the adjustable-focus collimator 30 and imaging optics 36, the light is resegregated according to Doppler shift, i.e., the image of any one reflected-light optical fiber is made up only of light from that fiber's location of measurement. Thus, the fringes with differing fringe shifts are no longer superimposed. They appear separately on the images of the three reflected-light fibers in each of the four exit beam images 38.

Because the interferometer is aligned at the bull's eye, i.e., at the center of the fringe pattern where the fringes are largest, only a small part of one fringe is present at any one time in the light from any one location of interest. Therefore, fringe shifts appear simply as changes in light intensity. As the velocities of the locations of measurement change, the resulting fringe shifts cause the brightness of the images of the reflected-light fibers to change, with one complete oscillation in brightness signifying a fringe shift of one fringe.

The light from the reflected-light fibers 26, now containing fringe shift information after passage through the interferometer, is recaptured in the recaptured-light optical fibers 42. These fibers transport the light to individual light detectors 44 for recording and later data reduction.

The data reduction is carried out using standard VISAR techniques. It makes use of all four fringe signals from each point of measurement. As usual, the four fringe signals come from the four exit beams 34, and arise from the polarization coding optics in the system. The four signals contain identical fringe shifts, but always differ by 90° from one to the next at any given time. Having four fringe signals in quadrature allows the data reduction program to determine the fringe shift (usually called the fringe count) for each location of measurement to within 2% of a fringe or better at any time. The velocity is simply the product of the fringe count and the Velocity-Per-Fringe constant of the VISAR interferometer.

Operational Procedure The steps taken by an operator in measuring the velocities of three locations of measurement using a three-beam VISAR are described below. The steps for measuring differing numbers of locations of measurement are very similar.

1. The operator sets the VISAR's Velocity-Per-Fringe (VPF) constant to the one deemed most suited to the velocities expected at the locations of measurement.

2. As depicted in FIG. 1, light from a single-frequency laser 10 is concentrated at the locations of measurement 24 on the specimen 22 by fiber optic probes 20. The same probes also gather reflected light into reflected-light optical fibers 26 for transit to the VISAR's adjustable-focus collimator 30. The operator adjusts the probes 20 to illuminate the desired location of measurement. The probes should also be at the optimum distance from the specimen 22, and the laser light from each probe should be at approximately normal incidence onto the specimen.

3. The operator adjusts the VISAR interferometer components so that an optimum interference fringe pattern (called the bull's eye) is produced in the exit beams from the interferometer.

4. The operator then adjusts the adjustable-focus collimator 30 and imaging optics 36 to produce four images of the end of the reflected-light fiber bundle 28, with magnification such that the images of the reflected-light fibers can be superimposed on the ends of recaptured-light fibers in the recaptured-light fiber bundles 40, as depicted in FIG. 2.

5. The three recaptured-light optical fibers carrying the 0° fringe signals are terminated in the 0° light detectors 46. Likewise, the optical fibers carrying the 90°, 180°, and 270° fringe signals are terminated in their respective light detectors.

6. The outputs of the light detectors 44 are recorded during the event of interest. The recordings are later analyzed by a data reduction program which translates them into records of the three velocity vs. time histories experienced by the three locations of measurement during the event of interest.

Further Clarification In a conventional push-pull single-beam VISAR, a single reflected-light optical fiber 26 brings light reflected from a single location of measurement to the VISAR's collimator 30. There the light from the fiber is collimated into a beam for transit through the VISAR's interferometer and polarization coding optics 32. The four resulting exit beams 34 of FIG. 1 with 90° phase relationships are sent to four light detectors 44. The light detector outputs are recorded for later data reduction to one velocity vs. time record.

Because of the wave superposition principles of optics, one VISAR interferometer can simultaneously form fringes corresponding to the Doppler shifts of light reflected from any number of locations of measurement on a specimen. However, if the light from two or more locations is inextricably mixed together, nothing is accomplished, because the individual fringe counts of two or more superimposed fringe signals cannot be unambiguously determined.

Dandekar's four-beam VISAR prevents the light from being inextricably mixed together by using four separate collimators for four reflected-light optical fibers. The collimators make four largely separate beams of light traverse the interferometer at the same time. However, the relatively large separation of the individual beams led to low-quality interference fringes in addition to other problems, as already stated.

The present multi-beam VISAR brings the reflected-light optical fibers 26 together into a bundle 28 so small that the light from the bundle as a whole can be well collimated by a single collimator 30. During much of the path through the interferometer, the light from the multiple locations of measurement is mixed together, but not inextricably, thanks to the adjustable-focus collimator 30 and the imaging optics 36 of the multi-beam VISAR. By forming images of the reflected-light fiber bundle 28 in the exit beams of the VISAR interferometer, the light from the multiple locations of measurement 24 is sorted out and captured into recaptured-light optical fibers 42, which conduct it to light detectors 44 for recording and later analysis. Thus, the light from each location of measurement in a multi-beam VISAR measurement receives exactly the same treatment as the light from one location of measurement in a single-beam VISAR: It is collected into an optical fiber and transported to the VISAR collimator, and collimated into a beam through the VISAR interferometer and polarization coding optics. The resulting four fringe signals with 90° phase relationships are sent to light detectors whose outputs are recorded for later data reduction to one velocity vs. time record.

By using a single adjustable-focus collimator 30 to collimate the light from all locations of measurement 24 at once, the my multi-beam VISAR minimizes the size of the beam passing through the interferometer, thus achieving the same fringe quality advantages of a single-beam VISAR. Furthermore, by the addition of imaging optics 36, conventional VISARs with excellent alignment, stability, and ease-of-use features can be upgraded to multi-beam VISARs. The cost of making multiple simultaneous VISAR measurements is greatly reduced by making use of only one VISAR interferometer and associated equipment for multiple beams, instead of one interferometer for each beam. These features fulfill the Objects of the Invention.

Optimization In order to recapture the light emerging from the VISAR interferometer 34 into recaptured-light fiber bundles 40, one might think the recaptured-light fiber bundles should be composed of fibers with exactly the same size and geometry as those in the reflected-light fiber bundle 28 so that the image of the latter would fit perfectly onto the former. However, the reflected-light optical fibers should be relatively small for fringe quality reasons. If their image is not magnified, the alignment and orientation of the recaptured-light fiber bundle end 38 is more difficult than if the image is magnified to match larger fibers in the recaptured-light fiber bundle. Also, the alignment to pick up all the desired light in the recaptured-light fibers is less critical if the cores 56 of the recaptured-light fibers are somewhat larger than the images 60 of the cores of the reflected-light fibers, as indicated in FIG. 2. This condition is achieved by using reflected-light fibers with larger outside diameters, relative to core diameter, than those of the recaptured-light fibers. Then, when the core-center-to-core-center size of the image of the reflected-light bundle matches that of the recaptured-light bundle, the desired condition illustrated in FIG. 2 is achieved. The desired core-center-to-core-center size of the image is attained by proper adjustments of the adjustable-focus collimator 30 and the imaging optics 36.

Application to Other VISAR Configurations The original VISAR configuration of Barker and Hollenbach, before Hemsing's push-pull innovation, makes use of only two output fringe signals from the interferometer, rather than the four output signals of the push-pull VISARs chosen here as the preferred embodiment of my multi-beam VISAR. Although the original VISAR configuration requires the recording of only two fringe signals of 90° phase difference, a third light detector, called the Beam Intensity Monitor, is required to record the overall intensity of the light returned from the location of measurement.

The original VISAR configuration, as well as others such as the lens delay VISAR of Amery, can be adapted to the multi-beam capability as easily as the push-pull VISAR. Simply apply the same concept of a fiber bundle input imaged onto geometrically similar fiber bundles to recapture the light after appropriate processing. In the original VISAR configuration, appropriate processing consists of first passing the light beam from the collimator through a beamsplitter to split off part of the light for Beam Intensity Monitors, one for each location of measurement. As already described, imaging optics along with the adjustable-focus collimator are used to form a real image of the end of the reflected-light fiber bundle in the split-off light. Forming the image separates the light into its components from each of the locations of measurement on the specimen, so that the separate light signals can be picked up by fibers (as already described) and sent to the assigned Beam Intensity Monitor light detectors. The remaining light is sent through the VISAR interferometer and polarization coding components, then separated according to origin by imaging, and sent to assigned light detectors, as already described.

DESCRIPTION OF SECOND EMBODIMENT OF THE INVENTION

Figure 3:
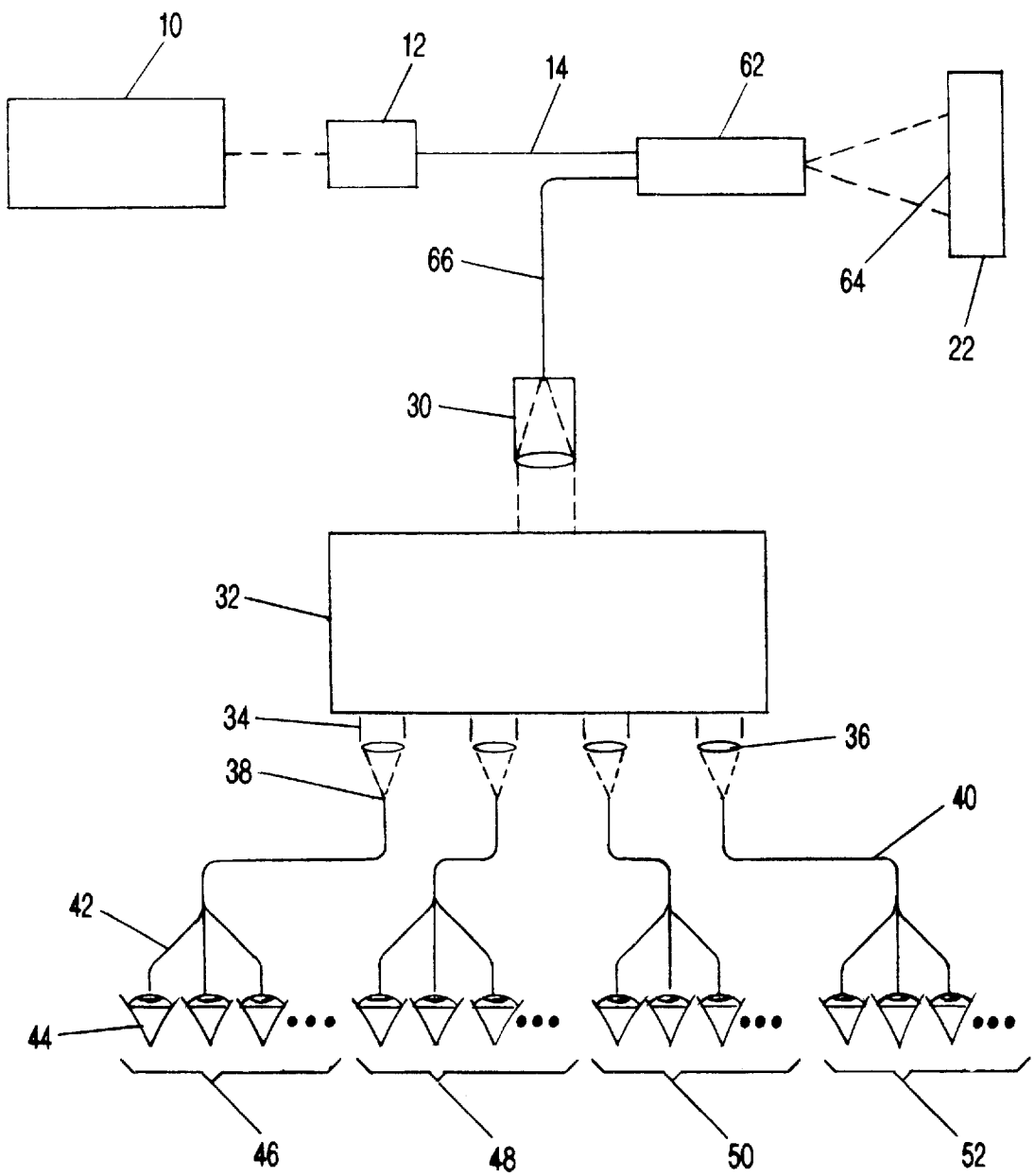
FIG. 3 shows a schematic of some of the components used in an area VISAR embodiment of the invention.

FIG. 3 shows a schematic of some components of a second preferred embodiment of my multi-beam VISAR in which dashed lines again indicate open-beam light paths. The laser 10, laser coupler 12, and laser-light fiber 14 are as shown in FIG. 1. A special imaging fiber optic probe 62 contains the end of the laser-light fiber 14. An area of measurement 64 on the specimen 22 is flooded with laser light. The same probe 62 also contains the end of an image-preserving optical fiber bundle 66, the other end of which terminates in the adjustable-focus collimator 30. The four exit beams 34 from the VISAR interferometer and polarization coding optics 32 are intercepted by imaging optics 36. The ends of recaptured-light fiber bundles are located at the exit beam images 38. Instead of only three recaptured-light optical fibers 42 from each exit beam 34 as in FIG. 1, there are many, terminating in many light detectors which receive the 0° fringe signals 46, the 90° fringe signals 48, the 180° fringe signals 50, and the 270° fringe signals 52.

OPERATION OF SECOND EMBODIMENT OF THE INVENTION

This embodiment, illustrated schematically in FIG. 3, might better be called an Area VISAR rather than a Multi-Beam VISAR, because it can measure the velocities of a large number of locations over an entire area of a specimen. It uses laser light to illuminate an entire area of measurement on a specimen, rather than individual locations of measurement. A real image of the area of measurement is then formed (with laser light reflected from the area) on the end of a 1000 $\mu$m diameter image-preserving optical fiber bundle 66, which transmits the image to the VISAR's collimator 30. Later, after the light from the image-preserving bundle 66 is collimated and transmitted through the VISAR interferometer and polarization coding optics 32, images of the area of measurement are reconstructed by the imaging optics 36 on the ends of recaptured-light fiber bundles 40.

The image-preserving optical fiber bundle 66 will normally be composed of a very large number of very tiny optical fibers, perhaps many thousands of them. Each fiber in such a bundle carries the light of a pixel of the image being transmitted. When an image of the area of measurement is formed on the end of a recaptured-light fiber bundle, each recaptured-light optical fiber in the bundle will recapture light only from that part of the area of measurement whose image happens to fall on the end of that fiber. Thus, each recaptured-light fiber in the recaptured-light fiber bundle defines a location of measurement by gathering light only from a defined location in the area of measurement. The user of the Area VISAR therefore can choose the number of locations of measurement into which the area of measurement is divided simply by choosing the number of optical fibers in the recaptured-light fiber bundle.

The recaptured-light fiber bundles can each be composed of 61 individual optical fibers with 100 $\mu$m cores, arranged in a hexagonal array, for example. The distance across the hexagonal array, assuming 125 $\mu$m fiber outer diameters, is close to 1000 $\mu$m. Thus, images of the 1000 $\mu$m image-preserving fiber bundle 66 with unity magnification fit quite well onto the 61-fiber recaptured-light fiber bundles. This configuration divides the area of measurement into 61 locations of measurement.

In order to obtain coherent data on each location of measurement, each of the four recaptured-light fiber bundles should be identical in size, number of individual fibers, and geometric array. Moreover, each of the four images formed by the adjustable-focus collimator 30 and imaging optics 36 should be of the same magnification, and should be oriented identically on the ends of the recaptured-light fiber bundles 40. This assures that corresponding fibers in the four bundles all recapture light from the same location of measurement.

Although the recaptured-light optical fibers 42 must have one of their ends bundled into recaptured-light fiber bundles 40 to recapture the light from the area of measurement 64, their other ends must be separated and sent to individual light detectors 44 for recording the fringe shifts in their light during the event of interest. Since four light detectors are required for each location of measurement, in the present example of 61 locations, 244 light detectors are required. When the number of required detectors is large, one or more streak cameras may be used as the light detectors. The light from hundreds of optical fibers can be simultaneously recorded vs. time on some streak cameras by lining the optical fibers up on the camera's slit.

CONCLUSIONS, RAMIFICATIONS, AND SCOPE OF THE INVENTION

Thus the reader will see that my multi-beam VISAR provides for multiple simultaneous VISAR measurements of velocity vs. time without any duplication of the interferometer, delay etalons, collimator, or polarization coding optical components of the VISAR. Inasmuch as these components are responsible for most of the cost of the VISAR, the multi-beam VISAR greatly reduces the cost per VISAR measurement. Furthermore, the objective of multi-beam operation of the VISAR is achieved without any degradation in VISAR fringe quality or ease-of-use features.

My multi-beam VISAR can also be used in the area VISAR configuration in which velocity histories can be measured simultaneously over an array of locations on a surface area, such as 61 different points, for example. Such measurements can be made with better than 1% accuracy and time resolution in the picosecond regime, as already demonstrated in single-beam VISARs. Velocity data from numerous points over an area will provide the information necessary to construct, via computer graphics, a motion picture showing the actual motion and deformation of the surface during the event of interest. Such information with such accuracy and time resolution is far beyond current instrumentation capabilities, and should be extremely valuable in certain fields such as controlled nuclear fusion.

While my above description contains many specificities, these should not be construed as limitations on the scope of the invention, but rather as an exemplification of one or two preferred embodiments thereof. For example, the laser light could be brought to and directed onto the locations of measurement via means other than those used in the examples.

Also, the area of measurement can be flooded with light, as in the second preferred embodiment. However, instead of collecting reflected light into an image-preserving fiber bundle with perhaps thousands of individual fibers, it can be collected into a bundle with the same number of fibers as the bundles which recapture the light after transit through the interferometer, as in the first preferred embodiment.

Also, optical components can be used to flood a non-circular area on the specimen, such as a line, with laser light. Imaging components could then image the illuminated area onto the ends of reflected-light fibers arranged in the same geometry as the illuminated area, such as a line. The reflected-light fibers could then be gathered into a more or less circular bundle for use in the collimator, as in the first preferred embodiment.

Also, consider the light resegregated according to location of measurement in the images formed in the exit beams from the interferometer. It could be recaptured by components other than optical fibers, such as mirrors, and transported to the assigned light detectors. Alternatively, with sufficient magnification and/or sufficiently small light detectors, the assigned light detectors could be placed directly in the images of their respective reflected-light fibers, thereby avoiding any necessity for recapturing the light.

Also, the means for creating images of the end of the reflected-light fiber bundle could include more or different components than those of the embodiments described. Imaging components could provide a zoom effect to size the image to match the size of the fiber bundles used to recapture the resegregated light, for example.

Accordingly, the scope of the invention should be determined not by the embodiments illustrated, but by the appended claims and their legal equivalents.

What is claimed is:

1. A multi-beam VISAR capable of simultaneously measuring the velocity histories of multiple locations of measurement, comprising
    (a) a VISAR interferometer, comprising means for producing a time delay of the light traversing one light path of said interferometer compared to light traversing the other light path of said interferometer,
    (b) means for collecting laser light reflected from said multiple locations of measurement into multiple reflected-light optical fibers, each said reflected-light optical fiber capturing light primarily from only one of said multiple locations of measurement,
    (c) a reflected-light fiber bundle, comprising the output ends of said reflected-light optical fibers in a fiber bundle,
    (d) means for collecting the output light from said reflected-light fiber bundle and collimating it into a beam for transit through said VISAR interferometer, (e) means for creating real images of the end of said reflected-light fiber bundle in the exit beams of said VISAR interferometer, thereby producing resegregated light beams, each comprising light reflected primarily from only one of said multiple locations of measurement, (f) means for individually recapturing said resegregated light beams and guiding their light to assigned light detectors, and (g) said light detectors, thereby providing for simultaneous VISAR measurements of velocity vs. time of said multiple locations of measurement using only one VISAR interferometer.

2. The multi-beam VISAR of claim 1 wherein said means for collecting laser light reflected from said multiple locations of measurement into multiple reflected-light optical fibers comprises multiple fiber optic probes, each of which comprises (a) one end of a laser-light optical fiber which conducts light originating from a laser to said fiber optic probe, (b) focusing means for focusing said laser light from said laser-light optical fiber onto one of said locations of measurement, (c) one or more light-collecting lenses which collect some of the light reflected from said location of measurement and focus it into the end of a reflected-light optical fiber, (d) said end of a reflected-light optical fiber.

3. The multi-beam VISAR of claim 1 wherein said means for collecting laser light reflected from said multiple locations of measurement into multiple reflected-light optical fibers comprises one or more fiber optic probes, each of which focuses one or more spots of light onto locations of measurement and collects reflected light from each location of measurement into separate reflected-light optical fibers, each of said fiber optic probes comprising (a) the ends of one or more laser-light optical fibers, (b) focusing means for focusing the light from each of said laser-light optical fibers onto separate locations of measurement, (c) light imaging means for collecting light reflected from said locations of measurement and forming real images of said locations of measurement on the ends of reflected-light optical fibers, (d) said ends of reflected-light optical fibers, each positioned in said real images so as to collect reflected light primarily from only one location of measurement.

4. The invention of claim 1 wherein said means for collecting laser light reflected from said multiple locations of measurement into multiple reflected-light optical fibers comprises a fiber optic probe, which floods laser light over an area of measurement comprising many locations of measurement, and focuses a real image of said area of measurement on the end of an image-preserving optical fiber bundle for transmission to the VISAR interferometer, said fiber optic probe comprising (a) the end of a laser-light optical fiber which conducts light originating from a laser to said fiber optic probe, (b) optical means for causing the light from said laser-light optical fiber to flood said area of measurement, (c) light imaging means for collecting reflected light from and forming an image of said area of measurement on the end of an image-preserving reflected-light fiber optic bundle, and (d) said end of an image-preserving reflected-light fiber optic bundle.

5. The invention of claim 1 wherein said means for collecting the output light from said reflected-light fiber bundle and collimating it into a beam comprises an adjustable-focus collimator, comprising (a) a frame for holding said reflected-light fiber bundle at a point close to the focal length of a first lens or combination of lenses, (b) said first lens or combination of lenses, for collecting the light emanating from the end of said reflected-light fiber bundle and transforming it from a diverging beam to a collimated beam, (c) focusing means whereby the exact distance from the end of said reflected-light fiber bundle to said first lens or combination of lenses can be adjusted, thereby producing an image of the end of said reflected-light fiber bundle at a variable distance from said adjustable-focus collimator.

6. The invention of claim 5 wherein said means for creating real images of the end of said reflected-light fiber bundle in the exit beams of said VISAR interferometer comprises (a) said adjustable-focus collimator, and (b) a second lens or combination of lenses located in each of said exit beams of said VISAR interferometer.

7. The invention of claim 1 wherein said means for individually recapturing said resegregated light beams and guiding their light to assigned light detectors comprises recaptured-light fiber bundles for each of said exit beams, said recaptured-light fiber bundles comprising recaptured-light optical fibers for collecting said resegregated light separately from each of said locations of measurement and guiding said light to assigned light detectors.

* * * * *